Oct. 14, 1958　　　L. M. CARVER　　　2,856,458
TELEGRAPH DISTORTION ANALYZER
Filed Jan. 24, 1956　　　2 Sheets-Sheet 1

INVENTOR.
Lawrence M. Carver
BY
ATTORNEYS

Oct. 14, 1958 — L. M. CARVER — 2,856,458
TELEGRAPH DISTORTION ANALYZER
Filed Jan. 24, 1956 — 2 Sheets-Sheet 2

INVENTOR.
Lawrence M. Carver
ATTORNEYS

United States Patent Office 2,856,458
Patented Oct. 14, 1958

2,856,458

TELEGRAPH DISTORTION ANALYZER

Lawrence M. Carver, Springdale, Conn., assignor to Stelma, Inc., Stamford, Conn., a corporation of Connecticut Application January 24, 1956, Serial No. 561,000

5 Claims. (Cl. 178—69)

The present invention relates, in general, to apparatus for analyzing the distortion in telegraph signals and, in particular, to an input circuit for such apparatus.

A telegraph distortion analyzer apparatus to which the present invention relates is disclosed in my Patent No. 2,712,038, dated June 28, 1955, and assigned to the assignee of the present invention. Said apparatus provides for the analysis of telegraph distortion by a visual indication of the bias or distortion present in the transmission of signal impulse changes from marking to spacing, and vice-versa.

An object of the present invention is to extend the utility of a telegraph distortion analyzer of the described type.

Another object is the provision in a telegraph distortion analyzer of a filter means which does not produce a change in distortion or bias reading with a variation in neutral loop current.

A further object is the incorporation of a filter means at a point in the input circuit for the distortion analyzing apparatus where the filtered signal will not vary in amplitude with variations in the amplitude of the telegraph loop signal.

The above and other objects, features and advantages of the present invention will be more fully understood from the following description considered in connection with the accompanying illustrative drawings.

In the drawings which illustrate the best mode presently contemplated of carrying out the invention:

Figure 1:
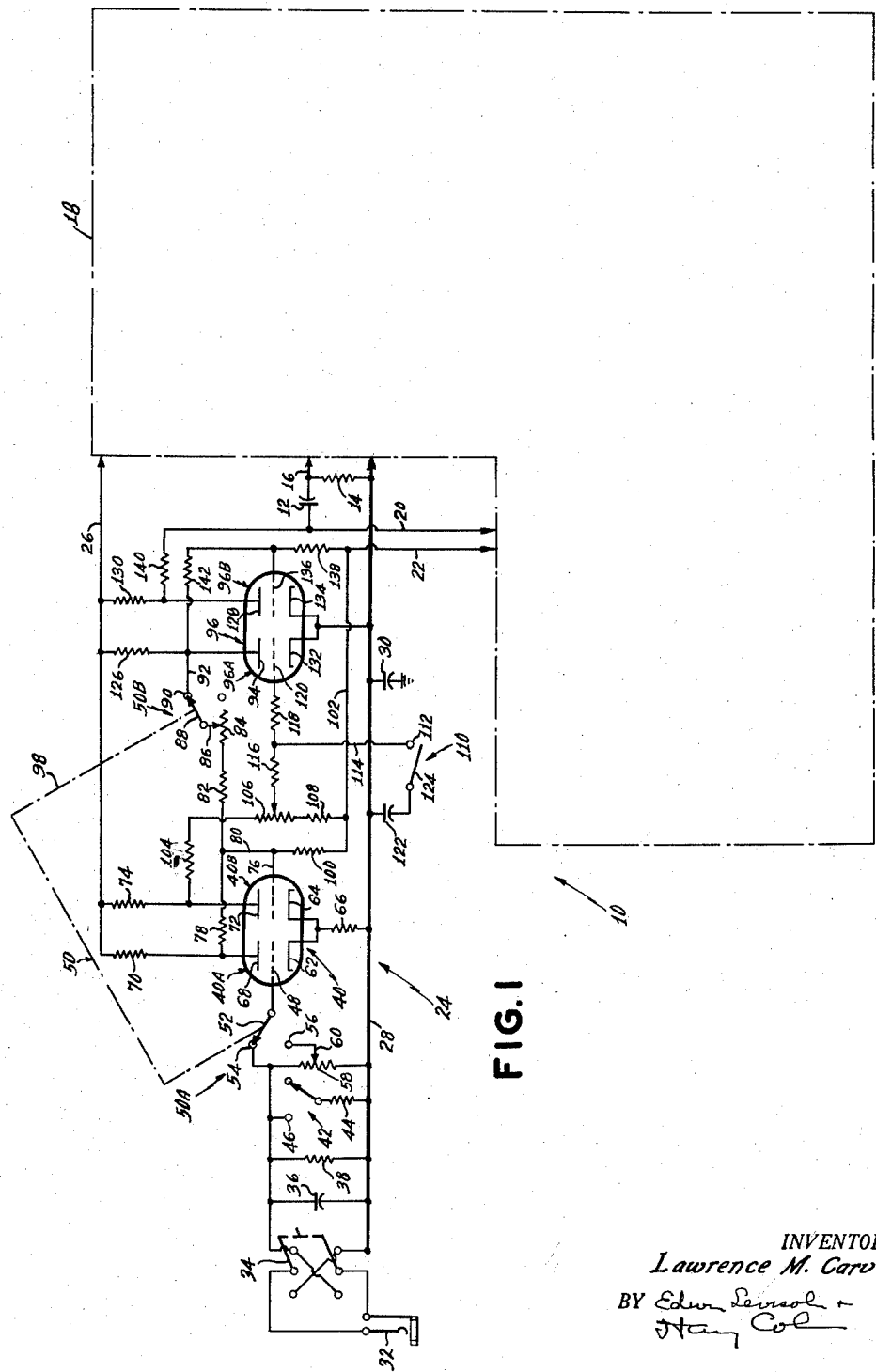
Fig. 1 is a combination schematic and block diagram of a telegraph distortion analyzer, pursuant to the present invention, the input circuit being illustrated by a schematic diagram and the remainder of the distortion analyzer being indicated as a block.

Referring now to Fig. 1 of the drawings in detail, the telegraph distortion analyzer of the present invention is generally indicated by the reference numeral 10. As fully illustrated and described in my previously identified patent, the distortion analyzing apparatus 10 includes a cathode ray tube which is provided with a saw tooth sweep voltage. When applied to the horizontal deflecting plates of the cathode ray tube, this sweep voltage supplies a horizontal line or trace on a time base against which the telegraph signal transitions are seen as vertical pips. In order to provide this type of sweep voltage presentation, provision is made in said patent for an input circuit which includes a trigger stage which is pulsed by the input signals from the neutral loop telegraph circuit, and for parallel circuits between the output of the trigger stage and the cathode ray tube.

Figure 3:
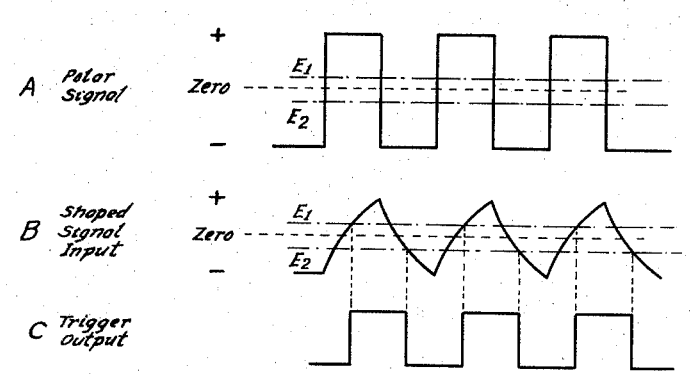
Fig. 3 is a wave form chart illustrating the operation of the input circuit with distortion analyzer apparatus being connected to a polar loop telegraph circuit.

The input circuit of said patent is adapted for operation only by a neutral loop telegraph circuit. In the present invention the input circuit 24 hereof is additionally adapted for operation by a polar loop telegraph circuit. However, the remainder of the distortion analyzer apparatus herein, which is indicated by the blockade 18 at the output of the input circuit 24, is exactly the same as that portion of the analyzing apparatus of my prior patent at the output of the trigger stage 20, as shown in Fig. 3 of said patent. More specifically, the square wave signal voltage at the output of the trigger stage of the input circuit of said patent is differentiated by an RC differentiator in one of said parallel circuits and applied to a limiter stage. Said differentiator is here shown as being constituted by the capacitor 12 and the resistor 14 at the output of the input circuit 24 hereof, and said components are identical with the capacitor 86 and the resistor 88, illustrated in Fig. 3 of said patent as the differentiator in one of said parallel circuits thereof. It will be understood that the arrowhead 16 from the differentiator 12—14 hereof represents the continuation of said one parallel circuit into the utilization circuit represented by the block 18, which represents the remainder of said circuit between said differentiator and the cathode ray tube, as fully illustrated and described in said patent. The second parallel circuit at the output of the trigger stage in the input circuit of said patent applies a second signal to the vertical deflecting plates of the cathode ray tube thereof. Said second signal is applied to the second parallel circuit through a lead, identified by the reference numeral 203 in Fig. 3 of said patent, to a second RC differentiator identified by the reference numeral 46 therein, and through said differentiator to the cathode ray tube. The lead identified herein at 20 at the output of the input circuit 24 hereof, is the same as the lead 203 of my prior patent, and it will be understood that the circuit from the lead 20 of the present invention, indicated by the block 18, is exactly the same as the circuit starting with the lead 203 illustrated and described in my prior patent. The leads identified by the reference numerals 22 and 26 herein extending from the input circuit 24, are exactly the same as the voltage supply leads identified by the reference numerals 250 and 108 in my prior patent. Therefore, it will be understood that the input circuit of the present invention, which is illustrated by the schematic portion of Fig. 1 and which is generally identified by the reference numeral 24, is connected to the remainder of the circuit of the telegraph distortion analyzer through the previously identified leads 16, 20 and 22 and 26 and that the balance of the circuit herein, which is generally indicated by the block 18, is exactly the same as that illustrated and described in my prior patent, except for one difference. The only difference between the portion of the analyzer circuit designated by the block 18 herein, and the corresponding circuit portion of my prior patent resides in the fact that in that the various ground points shown in my prior patent are eliminated from the circuit incorporated by the block 18, and in lieu of said ground points, provision is made herein for a common buss bar 28 to which all ground points are connected. Consequently, in practicing the present invention, it is necessary only to remove from ground all the grounded points in the portion of Fig. 3 of said patent indicated by block 18 and to connect said points to the buss bar 28. A capacitor 30 is interconnected between the buss bar 28 and the chassis of the distortion analyzer. The buss bar is connected also to an input jack 32 through the double throw-double pole switch 34. Consequently, it will be understood that the buss bar 28 is connected to one side of the telegraph loop which is being analyzed when the latter is connected through a plug received in the jack 32, the buss bar being connected to the chassis of the apparatus only through the capacitor 30. This arrangement constitutes a so-called "floating" ground in the analyzer apparatus and allows the telegraph loop to be isolated from the chassis of the instrument so as to prevent a D. C. short between the loop and the chassis.

Referring now in detail to the input circuit 24 of the present invention, the jack 32 is adapted to receive a plug connected to a telegraph loop, over which signals, that are to be measured for bias or distortion, are transmitted, for coupling the analyzer apparatus 10 to the telegraph loop. Consequently, the apparatus 10 can be readily patched in series in a teleprinter loop or local telegraph circuit. The double pole, double throw polarity switch 34 is connected in circuit with the jack 32, the capacitor 36 and the resistor 38 being connected across the switch 34 and constituting the input for a first trigger tube 40.

The tube 40 is connected as a Schmidt trigger tube, similar to the tube 20 illustrated in Fig. 3 of my prior patent. Input signal voltage to operate the tube 40 is developed across the resistor 38 by the telegraph signal loop current. Provision is made at the input to the trigger tube 40 for the input switch 42 which allows operation on either twenty or sixty milliamperes loop circuits. When the switch 42 is open, as illustrated, operation at 20 milliamperes is provided. When switch 42 is closed, the parallel resistance of resistors 38 and resistor 44 equals approximately one-third the resistance of resistor 38 so that a sixty milliampere loop current provides the same input voltage for the tube 40.

Pursuant to an important feature of the present invention, provision is made to operate the analyzing apparatus 10 when the input jack 32 is connected either to a neutral telegraph loop or to a polar telegraph loop. In this connection, it will be understood that a D. C. neutral telegraph loop circuit operates on the basis of current for marking and no current for spacing. In a D. C. polar telegraph loop circuit, approximately equal values of positive and negative voltage are applied alternately to the line at the transmitting end, the marking current being of one polarity and the spacing current being of the opposite polarity. As here shown, the first trigger tube stage 40 is constituted by a duo-triode having the sections 40A and 40B. The control grid 48 of the input section 40A is connected to one section 50A of a polar-neutral switch 50. More specifically, the movable switch member 52 of switch section 50A is connected to the control grid 48 so as to connect the latter alternately to the stationary contact 54, representative of the polar position, or to the stationary contact 56 representative of the neutral position. The polar contact 54 is connected to one end of a potentiometer 58 which is connected in parallel with the input resistor 38, and the neutral contact 56 is connected to the variable tap 60 of the potentiometer 58. The cathodes 62 and 64 of the trigger tube sections 40A and 40B are connected in common to a cathode resistor 66, which is connected to the buss bar 28. The anode or plate 68 of tube section 40A is connected through a voltage dropping resistor 70 to the plate voltage supply line 26, and the anode 72 of the other section is also connected to the line 26 through the voltage dropping resistor 74. The control grid 76 of the second section 40B of tube 40 is connected to the plate 68 of the first section through the resistor 78 and the lead 80. The control gird 76 is also connected through the lead 80 to a fixed resistor 82 and a variable resistor 84 in series with the resistor 82. The variable tap 86 of the resistor 84 is connected to the second section 50B of the polar-neutral switch 50. More specifically, the movable switch arm 88 of the switch section 50B is connected to the tap 86 and, in the closed position of said switch section is connected to the switch contact 90. Contact 90 is connected by the lead 92 to the anode 94 of the first or input section 96A of a second trigger tube stage 96. It will be noted that the switch arms 52 and 88 of the polar-neutral switch 50 are ganged for concomitant operation, as indicated by the broken line 98 so that, in the polar setting of the polar-neutral switch, the control grid 48 at the input section of trigger tube 40 is connected across the entire potentiometer 58, and the anode 94 of the input section 96A of the second trigger tube 96, is connected through the resistors 84 and 82 to the control grid 76 at the output section 40B of the first trigger tube 40. In the neutral position of the polar-neutral switch, the control grid at the input section of the first trigger tube 40 is connected to the movable tap of the potentiometer 58 and the circuit between the anode 94 of the trigger tube 96 and the control grid 76 of the trigger tube 40 is interrupted.

The control grid 76 of the output tube section 40B is connected through the resistor 100 and the lead 102 to the previously mentioned lead 22 through which a bias voltage is applied from the power supply incorporated in the block 18, as in my prior identified patent. The plate 72 of the second tube section 40B is also connected through the series resistance circuit constituted by the fixed resistor 104, the potentiometer 106 and the fixed resistor 108 to the lead 102. The potentiometer 106 constitutes a filter adjustment, as hereinafter explained in detail. A filter switch 110, has a fixed contact 112 connected through the lead 114 betwen the serially connected resistors 116 and 118 which extend between the control grid 120 of the input section 96A of the second trigger tube 96 and the potentiometer 106. The filter condenser 122 is connected between the bus bar 28 and the movable switch arm 124 of the switch 110, which in the closed condition thereof, makes contact with the stationary contact 112 to throw the filter capacitor 122 into the circuit and which, in the open position, thereof moves the filter capacitor 122 from the circuit. The anode 94 of the first trigger tube section 96A is connected through a voltage dropping resistor 126 to the voltage supply line 26, and the anode 128 of the second tube section 96B of said tube is connected through the voltage dropping resistor 130 to said voltage supply line 26. The cathodes 132 and 134 of the second trigger tube 96 are interconnected and are connected to the buss bar 28. The control grid 136 of the output section of the tube 96 is connected through the grid resistor 138 to the bias supply line 22.

The output from the second trigger tube 96 is applied from the plate 128 of the output section 96B through a resistor 140 from which the signal is applied in parallel through one circuit which includes the differentiator constituted by the previously mentioned condenser 12 and resistor 14 to the lead 16 for application to the limiter tube 28 of my previously identified patent, and is applied through another circuit through the previously mentioned lead 20 which, as previously indicated, is identical with the lead 203 in my prior patent for application to the cathode ray tube thereof. As previously indicated, the block 18 represents the balance of the circuit set forth in Figure 3 of my prior patent for applying said signal voltages in parallel to the vertical deflecting plates of the cathode ray tube 22 of my prior patent.

Assuming now that the polar-neutral switch 50 is in the neutral position thereof so that the control grid 48 of the input section of the trigger tube 40 is connected to the variable tap 60 and the circuit between the anode 94 of the input section of the second trigger tube 96 and the control grid 76 at the output section of the first trigger tube 40 is interrupted, the potentiometer 58 parallels the grid input resistor 38 and provides an adjustment of the voltage which is applied to the input grid 48 of the trigger tube 40. With the jack 32 connected to a neutral telegraph signal loop, the switch 34 is set so that the input to the trigger tube 40 is always negative during mark, that is when current is present in the telegraph loop. The potentiometer 58 is adjusted so that the switching in the trigger tubes 40 and 96, between the sections of each of said tubes, occurs at the half current points of the loop signal. When the applied signal voltage to the input grid 48 causes the grid voltage to decrease so that the grid goes in a negative direction, the plate current flow from the associated plate 68 through its load resistor 70 decreases so that the plate voltage increases, the plate becoming more positive. The plate 68 being connected to the grid 76 in the output section of the trigger tube 40, an increase in the positive voltage on the plate 68 makes the control grid 76 go positive. This increases the current flow from the associated plate 72 through its load resistor 74 so that the voltage on the plate 72 decreases or goes negative and, since the input grid 120 of the second trigger tube 96 is connected to the plate 72, said grid 120 also goes negative. This causes plate current flow from plate 94 through the load resistor 126 to decrease so that the positive voltage on the plate 94 increases. Since the plate 94 is connected to the control grid 136 through the resistor 142, the increased positive voltage on the plate 94 causes the voltage on the control grid 136 to go positive and this increases the current flow through the plate load resistor 130 to decrease the voltage on the plate 128 so that the latter goes negative.

Figure 2:
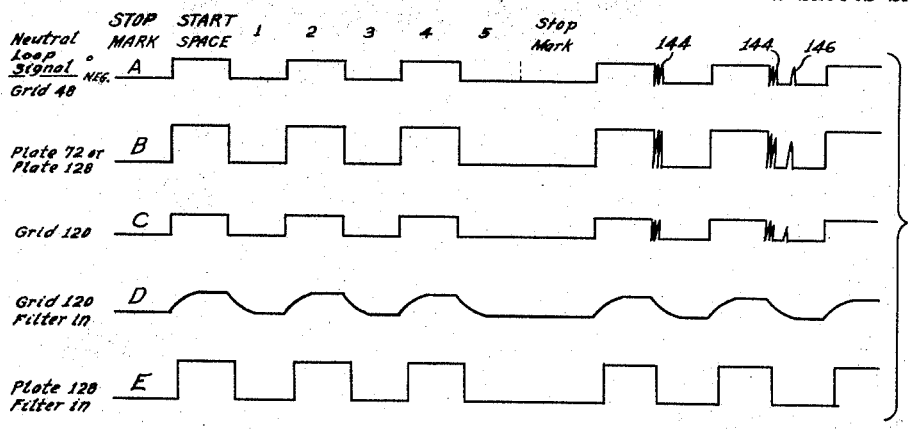
Fig. 2 is a chart illustrating the wave forms at various points in the input circuit with the distortion analyzer apparatus being connected to a neutral loop telegraph circuit.

For neutral loop operation, the tube 40 operates as a conventional trigger tube similar to the tube 20 in Fig. 3 of my prior patent, and the second tube 96 operates as a clipping amplifier. Figure 2 illustrates wave forms at various points in the input circuit during operation of the distortion analyzer apparatus 10 with a neutral loop input. Line A of Figure 2 illustrates the input signal voltage applied to the input grid 48 of the trigger tube 40. This line shows the wave form for the character or letter Y of the Baudot code which would appear on the input grid 48 when the letter Y is being transmitted over a neutral telegraph loop, the input to the grid 48 being always negative during mark, when there is current in the loop. Line B represents the wave form at the plate 72 of the tube 40 or at the plate 128 in the output section of the tube 96. It will be noted that with no signal the section 40A of tube 40 conducts as does the section 96B of tube 96 the other sections of the tubes being cut-off. With the application of the negative (or mark) signal voltage to the input grid 48, the tube sections 40A and 96B are cut-off and the tube sections 40B and 96B conduct to provide an output wave form at the plate 128 of tube sections 96B as indicated in line B of Fig. 2. It will be noted that this is an amplified square wave corresponding to the signal applied to grid 48. The output from plate 128 provides the signal which is fed through previously described parallel paths to the balance of the circuit indicated by the block 18. Line C of Figure 2 indicates the wave form present at the control grid 120 of the tube section 96A, it being noted that it follows the wave form of the applied signal, as in line A.

The use of a filter in the distortion analyzer apparatus 10 is highly desirable when measuring the distortion of neutral loops since relay bounce or breaks in the telegraph signal will produce spurious indications on the cathode ray screen of the apparatus making true bias transitions hard to determine or giving false indications of bias. Relay bounce in the input signal is indicated at 144 in line A of Figure 2 and a break in the signal is indicated at 146 in said line. The pips 144 and 146 can be removed from the signal by the use of a filter, as will be apparent from lines D and E of Fig. 2, before the signal is applied to the circuits of the apparatus indicated by the block 18. In this connection, it will be understood that line D represents the wave form at the input grid 120 of the tube 96, where the filter of the present invention is in operation, and line E represents the wave form at the anode 128 of the tube section 96B with the filter of the present invention in operation.

Figure 4:
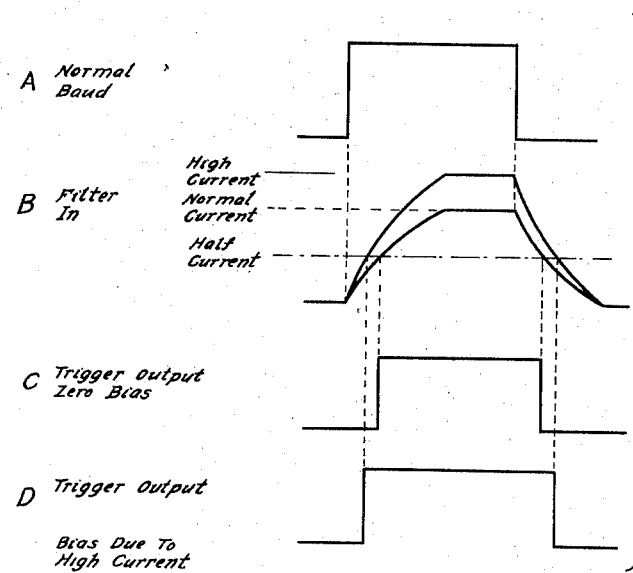
Fig. 4 is a wave form chart illustrating filtering action.

The common or prevalent practice is to place a filter before the trigger tube 40. However, this results in the condition where a change in loop current amplitude will produce a change in bias reading when the filter is used. Since loop currents are not always closely held to established values, errors in bias or distortion can occur. This is shown in Figure 4. Line A of this figure illustrates a normal space baud of a telegraph signal. Line B illustrates the effect of a filter if placed in the circuit before tube 40. When the loop current is normal and the trigger circuit is adjusted to operate at the half current points, as previously indicated, the output from trigger tube 40 or from trigger tube 96 will be undistorted as shown in line C of Figure 4. If however, the loop current increases to the high current level shown in line B, distortion will occur as shown in line D which shows bias distortion due to high current. It will be apparent that a low loop current will also produce a bias distortion but in the opposite direction from that shown in line B.

As here shown, the filter circuit consists primarily of resistor 116 and the capacitor 122. By incorporating this filter circuit after the trigger tube 40, operation is secured as shown in lines D and E of Figure 2. It will be noted from lines D and E of Figure 2 that the distortion due to relay bounce and break in the signal is eliminated when the filter is in the circuit by the closing of switch 124. Although the amplitude of the signal input or loop current which is fed to the control grid 48 of the trigger tube 40 may vary, the output of said tube will remain constant. As will be apparent from line B of Figure 2 since the second section 40B of tube 40 is going from saturation to cut-off, and the positive plate supply and the negative bias supply are regulated in amplitude at the power supply (the regulated power supply is shown at 216 in Fig. 3 of my prior patent, and is incorporated in the circuits indicated by the box 18 herein) consequently, the filtered signal, indicated at line D of Figure 2, will not vary in amplitude. The tube 96 is a clipping amplifier with its output section 96B swinging from saturation to cut-off and squares up the filtered signal, as shown in line E of Figure 2. The filter adjusting potentiometer 106 is used to adjust the operation of the tube 96 on the curve of the filtered signal so that a zero bias output is secured from tube 96 for a zero bias input signal to the tube 40, it being noted that the setting of the potentiometer 106 controls the amount of signal voltage applied to the control grid 120 of the tube 96.

With the switch 50 in the neutral position thereof, and with no signal applied, the input sections 40A and 96A of tubes 40 and 96 are conductive and the output sections cut-off.

Assuming now that the control grid 48 of trigger tube 40 is held negative by an input signal, the plate 68 is positive since the plate current through the load resistor 70 decreases, and this makes the control grid 76 go positive since it is connected through the resistor 78 to the plate 68. When the voltage applied to the control grid 76 goes positive, section 40B draws current and the plate current from the plate 72 through the load resistor 74 increases so that the voltage on the plate 72 decreases or goes negative. The tube section 40B drawing current through the common cathode resistor 66 increases the bias on the control grid 48 of the first of input section 40A making the voltage on said grid more negative and cutting off section 40A. The trigger tube 40 will trigger back to the first section 40A drawing current and the second section 40B cut off, if signal is removed from the input grid 48, as during a space condition.

As previously indicated, tube 96 operates as a clipping amplifier, the signal at grid 120 being derived by voltage variation at plate 72 in the output of tube 40. Voltage variation in the output of plate 94 is applied as signal voltage to the grid 136 and the amplified square wave signal is derived in the output of plate 128 to be applied to the previously described parallel circuits.

As previously indicated, another important feature of the present invention is the fact that provision is made to operate the distortion analyzing apparatus 10 in connection with a signal derived from a polar loop circuit, as well as for signal derived from a neutral loop circuit. In this connection the polar-neutral switch 50 performs two functions when thrown to the polar position thereof illustrated in Fig. 1. Section 50A of the switch connects the input grid 48 of the trigger tube 40 to the maximum voltage developed across the resistor 38 since triggering is desired at the minimum loop current. Section 40B connects the resistor 82 in series with the rheostat 84 between the plate 94 of trigger tube 96A and the grid 76 of the trigger tube 40B. The polar wave forms are illustrated in line A of Figure 3. A negative signal in the polar loop is assumed for mark and a positive signal is assumed for space. It is desired to have the tube 40 triggered to space condition when the voltage level E1, indicated in line A of Fig. 3, is reached and back to mark when the voltage level E2 is reached. It will be noted that the voltage level E1 is a positive voltage and that the voltage level E2 is a negative voltage. It is essential that the voltage E1 equals the voltage E2 in value, although of opposite polarity, so that a heavily shaped signal, as shown in line B of Fig. 3 will result in zero bias output, as shown in line C of Figure 3. These considerations are well known in the field of telegraphy.

Assuming now that the polar loop is connected to jack 32 and the switch is in the polar position thereof as illustrated, the plate 94 of the tube 96 being connected through the resistors 84 and 82 to the grid 76 of the output section of tube 40, a negative marking input signal will hold the grid 120 of tube 96 cut off, the plate 72 of tube 40 going negative and making the control grid 120 go negative. With the grid 120 at cut off, the plate 94 is positive and applies an additional positive potential through the resistor network 84 and 82 to the grid 76 of the tube section 40B. This grid is now held sufficiently positive so that removal of signal potential to the input grid 48 of section 40A will not allow the circuit to trigger back. The first section 40A of the tube 40 is still cut off by virtue of the positive voltage on the grid 76 which causes current to be drawn to the second section 40B of the tube 40, developing sufficient bias voltage across the common cathode resistor 66 to hold the first section 40A of the tube in a cut off condition, since the control grid 48 is connected through the switch 50A and the potentiometer 58 to the negative end of the cathode resistor 66. If thereafter, the grid 48 is made positive, as with a spacing polar signal, a potential E1 (Fig. 3) will be reached where the first section will conduct causing the regenerative trigger action within the trigger tube 40 and from the first section 96A of the trigger tube 96 so that the circuit triggers to its second state with the first sections of the tubes 40 and 96 drawing current and the second sections of the tubes cut off. By utilizing the resistor 87 as a variable resistor, such adjustment thereof may be made whereby the trigger points E1 and E2 are of equal value.

The filter capacitor 122 is not used during polar operation the switch 110 being open during polar operation. Polar loops are normally long and have considerable filtering or shaping due to the line characteristics.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent, is:

1. In a telegraph distortion analyzer, an input circuit including square wave generator means normally operated by signals derived from a neutral loop telegraph circuit to provide a square wave output for said analyzer, means for adapting said generator means for operation by signals derived from a polar loop telegraph circuit to provide a square wave output for said analyzer, whereby said analyzer may be operated for the analysis of both neutral and polar telegraph loops, filter means at the output of said generator means, and means to disconnect said filter means for polar loop operation of said analyzer.

2. In a telegraph distortion analyzer, an input circuit including square wave generator means normally operated by signals derived from a neutral loop telegraph circuit to provide a square wave output for said analyzer, means for adapting said generator means for operation by signals derived from a polar loop telegraph circuit to provide a square wave output for said analyzer, whereby said analyzer may be operated for the analysis of both neutral and polar telegraph loops, said generating means comprising a two-stage circuit connected in cascade, the first stage in the direction of signal input having circuit parameters to operate as a trigger stage and the second stage having circuit parameters to operate as an amplifier stage, said adapting means comprising means to provide a regenerative action from said second stage to said first stage, filter means connected between said trigger stage and said amplifier stage, and switch means to disconnect said filter means for polar loop operation of said analyzer.

3. In a telegraph distortion analyzer, an input circuit including a trigger stage and a clipping amplifier stage connected in cascade, said trigger stage having input and output sections, said amplifier stage having input and output sections, the output section of said trigger stage being in circuit with the input section of said amplifier stage, said sections of said trigger stage being interconnected to provide back and forth trigger action when operated by neutral loop signals, and means to provide regenerative feed back from the input section of said amplifier stage to the output section of said trigger stage whereby said trigger stage is adapted for operation by polar loop signals, a filter connected in circuit between the trigger output section and the amplifier input section, and switch means to disconnect said filter for polar loop operation of said analyzer.

4. In a telegraph apparatus, an input circuit for the reception of neutral loop telegraph signals from the telegraph loop and for the transmission thereof to a utilization circuit, and filter means provided in said input circuit at a point therein where a change in the amplitude of a neutral loop signal will not produce a change in distortion which may be present in said signals, said input circuit having square wave generator means, and said filter means being in circuit after said generator means.

5. In a telegraph apparatus, an input circuit for the reception of neutral loop telegraph signals from the telegraph loop and for the transmission thereof to a utilization circuit, and filter means provided in said input circuit at a point therein where a change in the amplitude of a neutral loop signal will not produce a change in distortion which may be present in said signals, said input circuit having square wave generator means, and said filter means being in circuit after said generator means, and means for squaring the wave form of the signal output from said filter means.

References Cited in the file of this patent

UNITED STATES PATENTS

| | | |
|---|---|---|
| 2,248,857 | Erickson et al. | July 8, 1941 |
| 2,668,192 | Cory | Feb. 2, 1954 |
| 2,774,957 | Carver | May 8, 1956 |